(No Model.)

R. M. FRANKLIN.
CRAB AND FISH TRAP.

No. 424,548. Patented Apr. 1, 1890.

Inventor:
Robert M. Franklin
by his Atty
Mason, Fenwick & Lawrence

Witnesses: J. P. Theo. Lang.
Edward T. Fenwick

UNITED STATES PATENT OFFICE.

ROBERT M. FRANKLIN, OF GALVESTON, TEXAS.

CRAB AND FISH TRAP.

SPECIFICATION forming part of Letters Patent No. 424,548, dated April 1, 1890.

Application filed August 13, 1889. Serial No. 320,569. (No model.)

*To all whom it may concern:*

Be it known that I, ROBERT M. FRANKLIN, a citizen of the United States, residing at Galveston, in the county of Galveston and State of Texas, have invented certain new and useful Improvements in Nets and Traps for Catching Crabs, Lobsters, and Fish; and I do hereby declare the following to be a full, clear, and exact description of the invention, such as will enable others skilled in the art to which it appertains to make and use the same.

The object of my invention, in the main, is the production of an improved net and trap for catching fish, crabs, and lobsters, which when "set" for lowering to the bed of a body of water shall, while in the act of descending through the water, automatically maintain nearly the fully-expanded area of the net, and which when it reaches and rests upon the bed or bottom of the body of water will automatically spread out to its fully-expanded area, and which from such position can be quickly closed around fish, crabs, and lobsters which may be feeding upon the bait placed upon or secured to such expanded surface.

Figure 1:
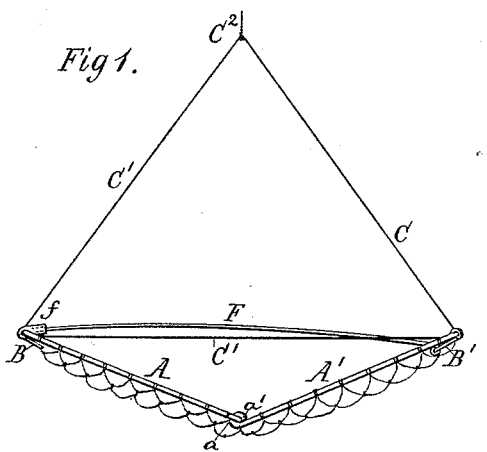
Figure 2:
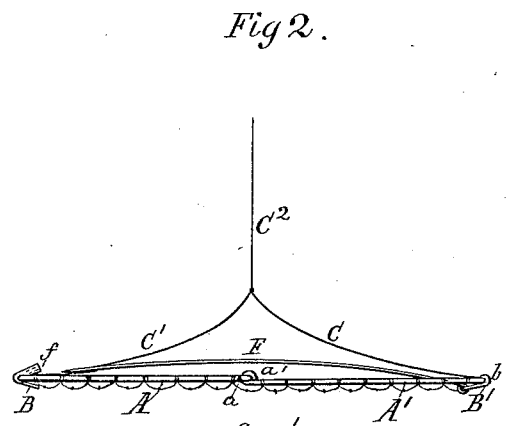
Figure 4:
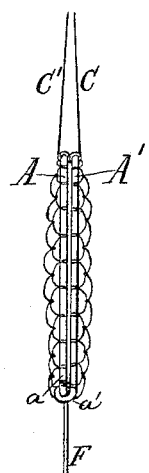
Figure 3:
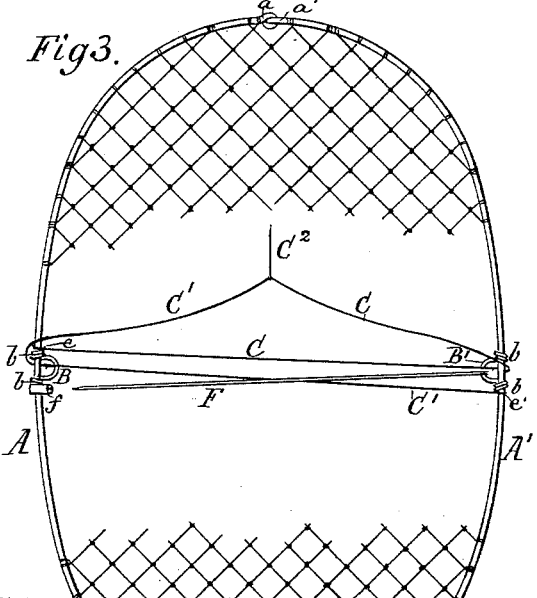
Figure 6:
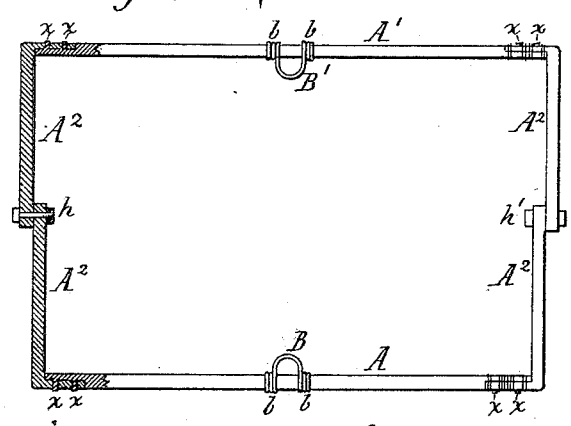
Figure 5:
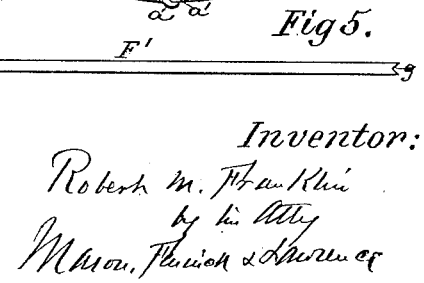

In Figure 1 I have shown my improved net and trap in central cross-section, the same being set for lowering into the water. Fig. 2 is a like section to Fig. 1, the view showing the net after it has reached the bed of a body of water and resting thereon. Fig. 3 is a plan view of the net after having been lowered upon the bed or bottom of a body of water, the net-work being broken partially away in order to clearly show the draw rope or cord and the set-rod for holding apart the frame of the net while descending through the water and other parts connected therewith. Fig. 4 is an end view of the combined net and trap as it would appear in the act of being drawn up from the bed or bottom of a bed of water. Fig. 5 is a modification of the set-rod shown in the preceding figures, and Fig. 6 is a modification of the frame of the net and trap.

The net may be of any desired shape, whether round, oval, or square, though I prefer the oblong or oval form, as indicated in Fig. 3, it affording great facility for ease of transportation upon the shoulder of a person when folded up.

In the figures, A A' indicate the two folding jaws or metal sections which compose the frame for the net-work $A^3$ of the trap, and which for nets of ordinary dimensions may be made of large-sized wire. They are made with hinging hooks and eyes at each end, as shown, the hooks $a$ of the section A being curved horizontally, while the hooks $a'$ of the section A' are curved in a vertical direction when interlocked and the net lying in the position shown in Fig. 3, and being thus hinged together the hinges allow of a ready closing of the net from its position shown in Fig. 3 to its position shown in Fig. 4.

Central of the length of the jaws or sections A A' of the net I secure wire guide-loops, as at B B', to each section and opposite each other, as shown, the extremities of which loops, at $b$, are wound tightly around the metal sections. These loops, being central of the length of the net, tend to balance the net in its descent through the water, and have closing-cords C C' passed through them, as shown, both of which at one of their ends are securely fastened to a raising rope or cord $C^2$. The cord C, from its connection with $C^2$, passes down outside of and around the section A', and then on through the guide-loop B', and thence onward until it reaches the section A, to which its end $e$ is firmly tied to one side of the guide-loop B, as shown, while the cord C', from its connection with the raising rope or cord $C^2$, passes down, outside of, and around the section A, then on through the guide-loop B, and onward until it reaches the section A', to which its end $e'$ is firmly tied, as shown, the point of attachment of the end $e$ of the cord C being to one side of the loop B, while the point of attachment of the end $e'$ of the cord C' is on the other side of the loop B', as shown, thereby preserving a balance to the net when the raising-cord $C^2$ is suddenly drawn upon to close the net from its open spread condition (shown in Fig. 3) to its closed condition. (Indicated in Fig. 4.)

As clearly indicated in Figs. 1, 2, and 3, I provide a socket $f$ to the section A of the net-frame (or in lieu thereof a properly-tapering hole may be made in the section A) to receive the pointed end of a metal set-rod F, one end of which is hinged, as shown, to the guide-loop B' of the section A'. This metal rod F, it will be seen by reference to Fig. 3, is of less length than the distance between the sections A A' when fully spread apart, as represented in Fig. 3, so that when the pointed end of the rod F is made to enter the socket $f$ it will allow the sections A A' of the net-frame to approach each other a short distance, as indicated in Fig. 1, the net in said figure being represented as set ready for lowering through the water, the tension of the cords C C' upon said section during the act of lowering serving to prevent the net from closing and hold the net in a properly-spread condition for readily passing down through the water; but when the net strikes upon the bed of the body of water the gravity of said metal sections causes them to fully spread apart, thus drawing the sharp-pointed rod F out of and away from its socket $f$ and causing the rod to rest upon the meshes of the net ready to be thrust through one of its meshes when the ropes or cords C C' C² are operated to suddenly close the net and trap the fish, crabs, or lobsters which may be eating the bait secured thereon at different points along the center of the net; and if perchance the rod F should not pass through one of the interstices of the net when the folding jaws or sections A A' are suddenly closed, but strike the cord composing the net, still, being sharp-pointed, it will pierce through the cord without offering any appreciable obstruction to the sudden closing of the net. In other words, the net is lowered to the bottom by means of the cords C C' C², which are so applied as to quickly close the net before it can be drawn up, thus holding fast the crabs, lobsters, and fish within the net, while the net, after being closed, can be drawn up leisurely from any depth. In lowering the net the rod F, hinged to the section A' on one side of the net, with its pointed end in a hole in section A or socket, as at $f$, as the case may be, at the other side of the net, prevents the draw ropes or cords from closing the net, and this rod, being a fraction shorter than the width of the net, is kept in place by the tension of the draw-ropes until such tension is relieved by the net's reaching the bottom, whereupon the rod is automatically disengaged and lies on the net in position to slip through the meshes without interfering with the closing or raising of the net. This metal rod is designed for use in deep water; but for shallow water a wooden rod or stick F', as shown in Fig. 5, with forked ends, as at $g$ $g$, fitted to engage with the sections A A', may be tied to the end of the raising-cord C² and be used in lieu of the metal rod F, and when the net reaches bottom it will become disengaged and may be drawn up, and, if desirable, the one stick may be used for lowering a number of nets.

The great advantage possessed by my improved net and trap is that it can be used at depths where other nets or seines would be of no service.

In Fig. 6 I have shown a modification of of the folding jaws which compose the frame of my improved net and trap, in which $h$ $h'$ are pivot-bolts. The side sections or rods A A' are flattened for three or four inches at each end, as shown, each end having two rigid or fixed bolts $x$ $x$, which engage in corresponding holes in the flattened ends of the hinged rods A² A², and the frame may be coupled together and fastened with string or wire or screw-nuts on the ends of the bolts $x$ $x$. By this modification the net may be taken apart and very compactly folded up for transportation.

What I claim as new, and desire to secure by Letters Patent, is—

1. A net or trap for crabs and fish, which comprises flat frame-sections hinged together, netting attached to said sections, and a rod or bar extending across said sections and engaging with suitable devices thereon for holding said sections partly extended until the hinged sides strike bottom and thereby release the rod or bar, substantially as described.

2. A net or trap consisting of two hinged frame-sections having a raising-cord attached thereto, closing-cords secured to the opposite sides of such sections and passing around and beneath the opposing sides of the frame, and a transverse rod or bar loosely engaging the outer rim of each section to keep them temporarily extended, substantially as described.

3. A net or trap having two flat hinged sections, netting secured thereto, lifting and closing cords thereon, and a rod or bar hinged to the outer side of one section and loosely engaging a socket on the opposite section, substantially as described.

In testimony whereof I hereunto affix my signature in presence of two witnesses.

ROBERT M. FRANKLIN.

Witnesses:
FRANK M. SPENCER,
JOSEPH FRANKLIN.